Feb. 24, 1948.　　　W. D. GOSSARD　　　2,436,386
CALCULATOR
Filed Feb. 5, 1946　　　3 Sheets-Sheet 1

INVENTOR.
WALDO D. GOSSARD
BY
William D. Hall
ATTORNEY

Feb. 24, 1948. W. D. GOSSARD 2,436,386
CALCULATOR
Filed Feb. 5, 1946 3 Sheets-Sheet 2

INVENTOR.
WALDO D. GOSSARD
BY
William D. Hall
ATTORNEY

Feb. 24, 1948. W. D. GOSSARD 2,436,386
CALCULATOR
Filed Feb. 5, 1946 3 Sheets—Sheet 3

*INVENTOR.*
WALDO D. GOSSARD
BY
*William D. Hall*
ATTORNEY

Patented Feb. 24, 1948

2,436,386

UNITED STATES PATENT OFFICE 2,436,386

CALCULATOR

Waldo D. Gossard, Eureka, Calif., assignor to the United States of America, as represented by the Secretary of War Application February 5, 1946, Serial No. 645,672

5 Claims. (Cl. 33—68)

(Granted under the act of March 3, 1883, as amended April 30, 1928; 370 O. G. 757)

The invention described herein may be manufactured and used by or for the Government for governmental purposes, without the payment to me of any royalty thereon.

The present invention relates to calculators and more particularly to means for mechanically measuring various distances in space.

The said invention is well adapted for obtaining a height in space where the base line is known or for determining a base line in space where the height is known, for any relative motion in parallel planes. Although it will be understood that the present invention is not limited thereto, said invention will be illustrated herein by an embodiment which is used for determining differences in altitude between airplanes and clouds.

It is an object of the present invention to provide a means whereby the vertical distance in space between two objects, which are moving relative to each other, may be measured.

It is a further object to provide such a device which is relatively simple and rapid in operation and whereby the desired results may be obtained by relatively simple mathematical calculations.

It is still a further object to provide a device whereby the difference in altitude between an airplane, moving along a level course at a known air speed, and a cloud, either above or below it, may be readily and quickly calculated.

These and other objects and advantages of the present invention, which will be better understood as the detailed description thereof progresses, are obtained in the following manner.

If it is desired to measure the vertical distance (which will be referred to hereinafter as "H") between two objects (A and B) located respectively in two spaced horizontal planes, one of which objects is moving in a straight line relative to the other, a calculator embodying the present invention may be positioned at one of said objects (A). Such a calculator includes sighting means adapted to be directed at the second of said objects (B) during such relative movement. The sighting means are swingable about a pivot point located in the plane of the first object (A) and there are provided scale means adapted to measure the length of the swing (which for convenience will be referred to as the "swing distance" or "d") of the sighting means along a straight line, which line is disposed in a horizontal plane located at a known, fixed vertical distance (which will be referred to hereinafter as the "calculator height" or "h") either above or below the said pivot point. If the second object (B) is sighted for a certain length of time (T) and the "swing distance" or "d" (as defined above), through which the sighting means are swung during said time, and the distance (D) the two objects (A and B) move relative to each other during said time are ascertainable, then the vertical distance (H) between the pivot point (which is in the plane of object A) and the second object (B) may be readily calculated.

More specifically, assume an airplane flying along a straight, horizontal air course at a known constant speed (S) above a particular cloud. If a calculator embodying the present invention is positioned in the airplane, and, at a certain instant in time, said cloud is sighted through the sighting means of the calculator and said cloud is then tracked by the sighting means for a length of time (T) which is clocked and the "slide distance" (d), through which the sighting means is swung during said time is determined, then the "calculator height" (h) is to the vertical distance (H), between the airplane and the cloud, as the "swing distance" (d) is to the air distance (D) flown by the airplane. As the air distance (D) flown by the airplane may be found from its known speed (S) and the clocked time (T), it is readily apparent that the vertical distance (H) between the airplane and cloud may be easily calculated. This will be further discussed below in connection with Figures 4–6 of the annexed drawings.

It will be understood that the same principle may be similarly applied where the airplane is below the cloud, and where it is desired to ascertain the height of an object above a vehicle moving along the ground, etc.

In the accompanying specification there is described, and in the annexed drawings shown, what is considered a preferred embodiment of the present invention. It is however to be understood that the present invention is not limited to said embodiment.

In said drawings.

Figure 1:
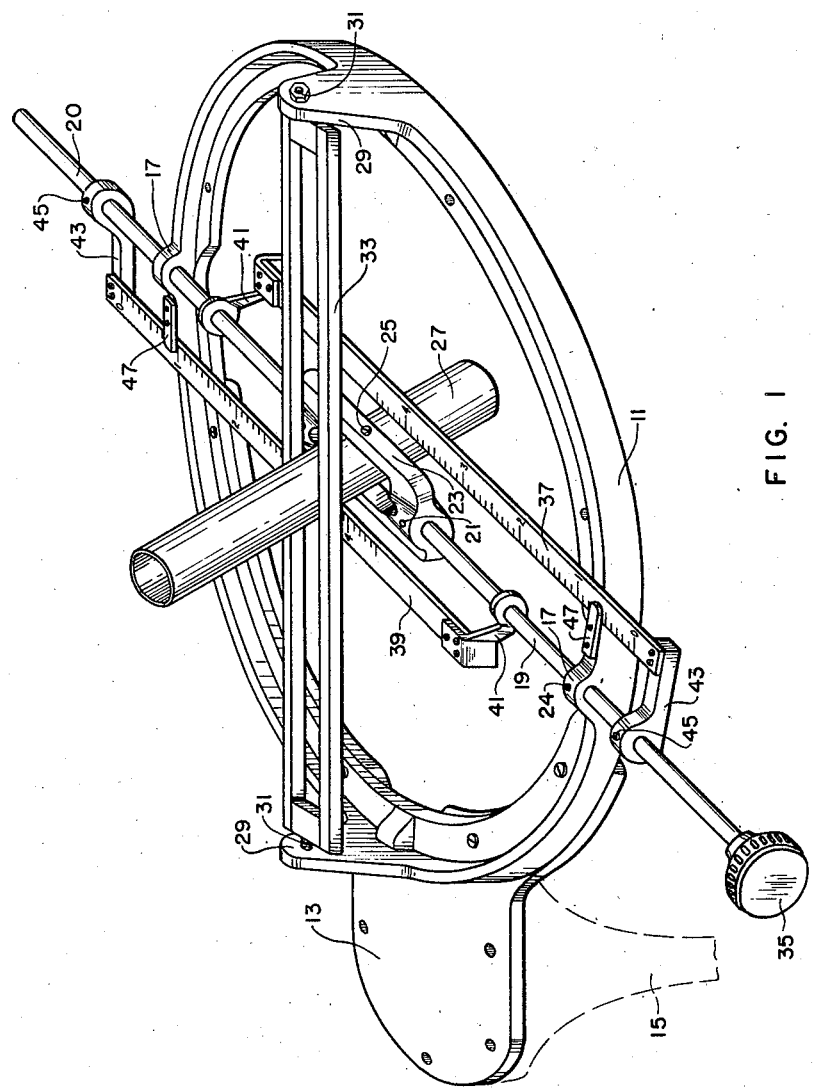
Figure 1 is a perspective view of a cloud height calculator embodying the present invention, the parts being shown in their relative positions during the tracking of a cloud located below the airplane in which the instrument is positioned.
Figure 2:
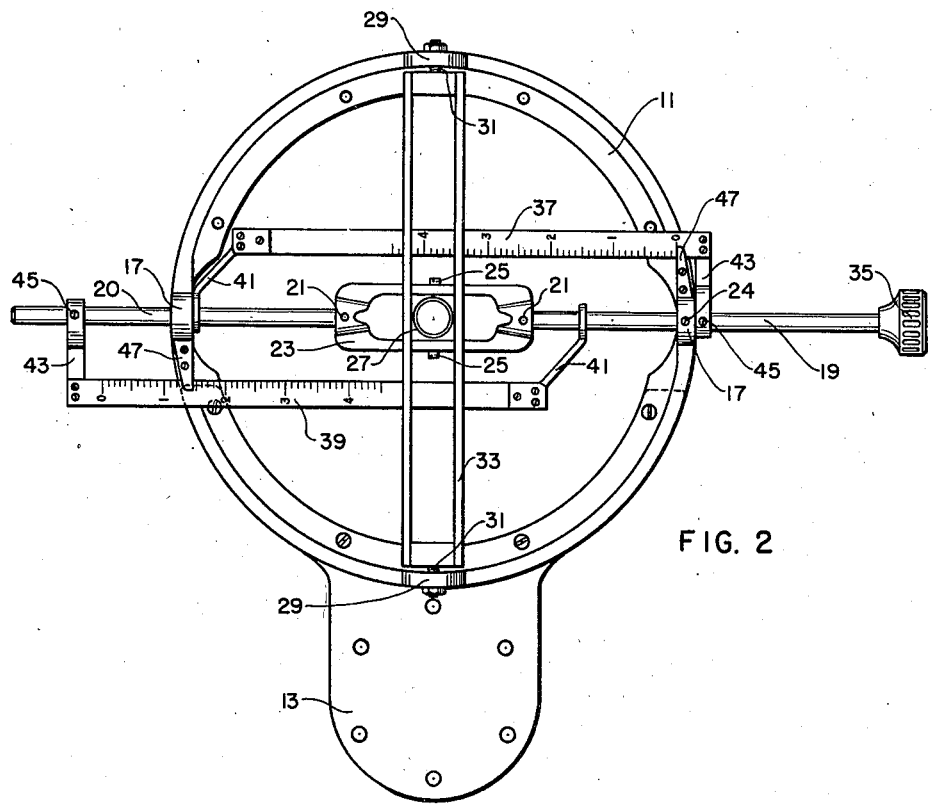
Figure 2 is a plan view of the calculator of Figure 1, the parts being shown, however, when the sighting tube is in a vertical position.
Figure 3:
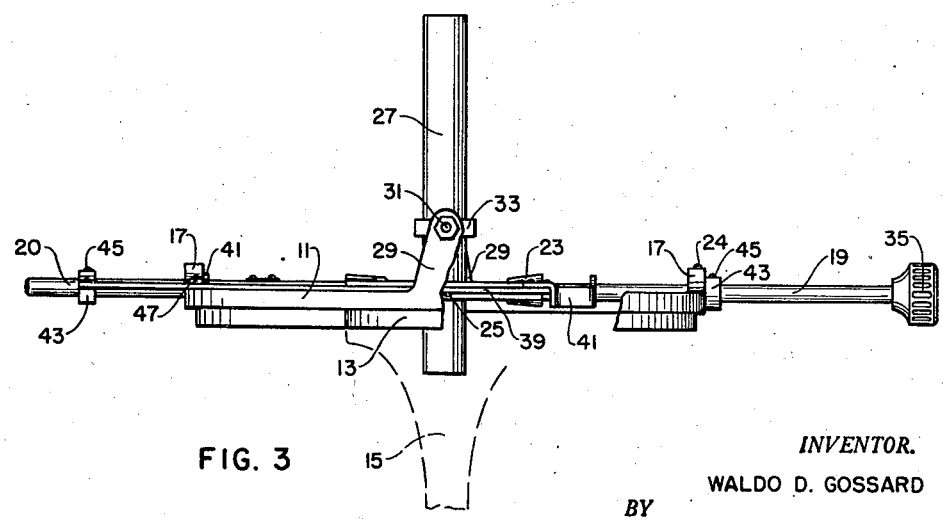
Figure 3 is an elevational view, partly cut away, of the calculator of Figure 2.

Referring now more particularly to the drawings, the cloud height calculator illustrated in Figures 1–3 includes a horizontally positioned annular base member 11 which may be sustained in an airplane by means of a bracket 13 secured to said base member 11, which bracket 13 is fastened to a pedestal 15 (shown in phantom) of any suitable shape to support the calculator in an operable position in the airplane. The bracket 13 may be secured to the base member 11 at any one of several convenient positions so as to facilitate its mounting in an airplane. As the calculator must be substantially level, irrespective of the fore and aft trim of the airplane, a suitable levelling means (not shown) should preferably be interposed between the bracket 13 and the pedestal 15, although levelling may be accomplished by shims (not shown) under the pedestal base. A bubble level (not shown) aligned fore and aft may also be attached to the calculator at some suitable point.

Said annular base member 11 is provided at diametrically opposite positions with a pair of bearings 17 adapted respectively to slidably sustain a pair of horizontally and coaxially disposed shafts 19, 20. The inner ends of said shafts 19, 20 are secured respectively, by means of set screws 21, to the opposite ends of a yoke 23, which is generally oval in shape and is disposed with its longer axis coaxial with the shafts 19, 20. Preferably, at least one of the bearings 17 is provided with a suitable adjustable friction means, such as a felt plug (not shown), maintained in contact with one of said shafts 19, 20 by means of a friction adjusting screw 24, so as to keep the shafts 19, 20 and yoke 23 from undesired or abrupt movements.

Said yoke 23 is provided, coaxial with its shorter axis, with a pair of inwardly extending gudgeons 25 upon which is swingably mounted a sighting tube 27. The sighting tube 27 shown in the drawings is merely a hollow metal tube, blackened on the inside, although, if desired, it may be fitted with a suitable lens system (not shown), depending upon the object to be sighted.

The base member 11 is also provided, at two points diametrically opposite each other, and spaced in quadrature relative to the bearings 17, with a pair of upwardly extending tabs 29 which are provided respectively with a pair of inwardly extending trunnions 31. The said trunnions 31 pivotably sustain the opposite ends of an elongated frame 33 through which the sighting tube 27 extends. The tube 27 is slidable laterally along the length of said frame 33.

The outer end of the shaft 19 terminates in a knob 35 which is rigidly secured thereto. Two slidable calibrated scales 37, 39 are arranged on opposite sides of the shafts 19, 20 and parallel thereto. The scale 37 (to the right in Figure 1) is preferably used when sighting at clouds below the airplane and the other scale 39 when sighting at clouds above it.

The scale 37 is slidably secured to the shafts 20 and 19, respectively, by means of inner and outer arms 41 and 43, which are fastened to the opposite ends of said scale 37 and are positioned respectively, inside and outside of the annular base member 11. The inner arm 41 is of flat metal and bent at an angle so that it may be moved into intimate proximity with both the base member 11 and the yoke 23, thereby allowing the scale 37 and the yoke 23, the longest possible sliding movements. The outer arm 43 is provided with a suitable adjustable friction means which comprises a felt plug (not shown) held in position against the shaft 19 by means of a friction adjusting screw 45, so that, during operation of the calculator, said scale 37 will move longitudinally along with the shafts 19, 20 when said shafts are moved by the knob 35. A pointer 47 is fastened to said base member 11 and extends over the scale 37. It will be noted that the pointer 47 is at the zero position of the scale 37 when the outer arm 43 of the latter abuts the base member 11 (as shown in Figures 2–3).

The second slidable scale 39 is similarly but oppositely positioned and secured.

From the foregoing description it will be seen that, by means of the knob 35, the entire central assembly comprising the shafts 19, 20, the yoke 23, the inner and outer arms 41, 43 and the two scales 37, 39 may be longitudinally slid along the axis of said shafts. Upon rotating the knob 35, the shafts 19, 20 and the yoke 23 will rotate about their axis. It will be seen further that longitudinal movements of the yoke 23 will cause the sighting tube 27 to swing about the axis of the gudgeons 25, as the upper portion of said tube 27 is imprisoned within the frame 33. Thus such movements will also cause the tube 27 to pivot about the trunnions 31 along with the frame 33. Rotation of the knob 35 will cause the sighting tube 27 to swing about the longer axis of the yoke 23. Thus it is seen that, by a combination of longitudinal and rotational movements of the knob 35, the sighting tube 27 may be swung universally as desired. Longitudinal movements of the knob 35 result in longitudinal movements of the sliding scales 37, 39 but rotational movements of the knob 35 have no operational effect whatsoever upon said scales 37, 39.

In the operation of the calculator just described, let us assume first that it is sustained in an airplane in a position where clouds at a lower altitude are visible through a window or suitable opening. The calculator should be positioned so that the plane of the annular base member 11 is suitably levelled for the fore and aft trim of the airplane at the particular time, the axis of the shafts 19, 20 is parallel to the longitudinal axis of the airplane and the knob 35 extends aft and the axis of the frame 33 is parallel to the lateral axis of the plane. In other words, the long axes of both the yoke 23 and the frame 33 should be parallel to the earth's surface immediately below the airplane.

The pilot should be instructed to maintain a constant and level course through the air, at a constant air speed, to maintain the same fore and aft trim and to maintain the plane level laterally during the use of the calculator.

When a reasonably small, well defined cloud feature is located for an observation, the operator manipulates the handle 35 so as to sight downwardly through the tube 27 at said cloud. During such manipulation he keeps the forefinger of his hand on the knob 35 pressed against the scale 37 so as to keep it at its zero position. At the instant that the tracking of the said cloud is commenced two other things are done simultaneously; the operator releases the right hand scale 37 at its zero position (as shown in Figures 2 and 3) and a stop watch is tripped. The said cloud is then tracked through the sighting tube 27 for a suitable time. At the instant that tracking of said cloud is completed two things are done; the watch is stopped and a reading is made of the sliding scale 37. It is important for accurate results that at least at the instant the stop watch is started and the instant it is stopped, the cloud formation be centered in the sighting tube. During the balance of the tracking it is only essential that the cloud be not lost.

Diagrammatic representations of what occurs during the tracking of a cloud by the calculator described above are shown in Figures 4–6. Although the airplane moves relative to the cloud, for convenience the said diagrams represent the cloud as moving relative to the airplane. The sighting tube 27 is shown in the two relative positions taken by it at the instant of commencement and the instant of completion of the tracking operation. The axes of said tube 27 in said two positions intersect at a pivot point which represents the axis of the frame 33 (the trunnions 31).

"$h$" represents the "calculator height," as already defined at the beginning of the specification, which is the vertical distance between the axis of the frame 33 and the axis of the yoke 23. "$d$" represents the "swing distance," or the distance along the scale 37 (or 39) measured during the tracking operation. S represents the true air speed of the airplane and T the time of the tracking operation, as shown by the stop watch. Thus ST indicates the air distance traversed by the airplane during the tracking operation. H represents the difference in altitude between the airplane and the cloud which was tracked.

Figure 4:
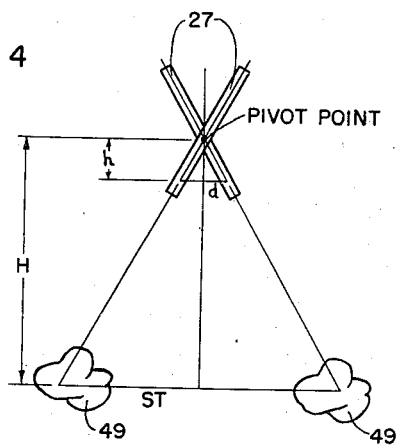
Figure 4 is a diagrammatic representation of the geometry involved in the operation of the calculator shown in Figures 1–3 when the cloud being tracked is directly below the air course of the airplane.

Figure 4 shows a special case when the cloud is directly below the line of flight of the airplane. It will be readily apparent from the diagram of said figure that two similar triangles are formed, so that we can set up the equation, $$\frac{h}{d} = \frac{H}{ST} \quad (1)$$

or $$H = \frac{hST}{d} \quad (2)$$

As $h$, $d$, S and T are known, H may be calculated.

In actual practice H and ST may be in any units so long as they are the same units. Thus, for convenience, they may be in feet. $h$ and $d$ may likewise be in any units so long as they are the same; for convenience they may be in inches.

The calculator described above may also be $$H \text{ (feet)} = \frac{h \text{ (inches) } ST \text{ (feet)}}{d \text{ (inches)}} \quad (3)$$

It will be seen that, if $h$ is equal to one inch, then $$H \text{ (feet)} + \frac{ST \text{ (feet)}}{d \text{ (inches)}} \quad (4)$$

Thus, in the calculator described above the distance between the axes of the yoke 23 and the frame 33 (calculator height), is preferably one inch and the scales 37, 39 are calibrated in inches. It will be understood however that a calculator having any convenient distance ($h$) between its said axes will be operable so long as the scales 37, 39 are calibrated in multiples of said distance ($h$). From the last equation mentioned above, it will be seen that the vertical distance (H) between the airplane and the cloud tracked is equal to the true air distance (D or ST) traveled by the plane during the tracking operation divided by the swing distance ($d$) or the reading taken at the end of the tracking operation on the scale 37 (or 39).

The calculator described above may also be used to measure the vertical distance to a cloud positioned at a higher altitude than the airplane. The instrument must then be positioned below a window or opening at the top of the airplane so that suitable visibility for tracking in an upward direction is obtained and it should be positioned high enough so that an operator may stand or sit below the instrument and track clouds by looking upward through the sighting tube 27. During such operation the right hand scale 37 is disregarded entirely and the left hand scale 39 is used.

Figure 5:
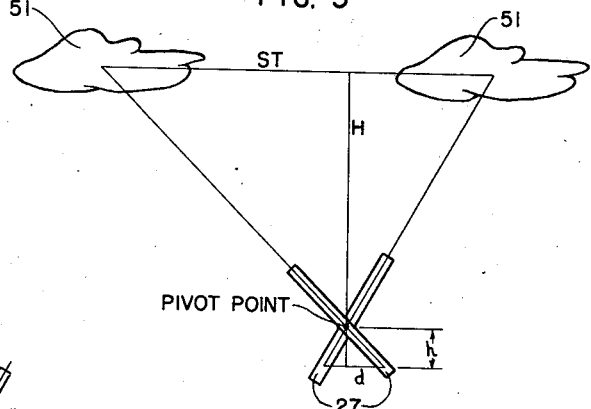
Figure 5 is similar except that the cloud is directly above the air course of the airplane.

Figure 5 is a diagrammatic representation of the special situation when the cloud tracked is directly above the line of flight of the airplane. It will be noted that again there are two similar triangles. The only difference between Figures 4 and 5 is that in one the smaller triangle is inside, and in the other outside, of the larger triangle. The equation set forth above and its solution still holds however for this case.

Figure 6:
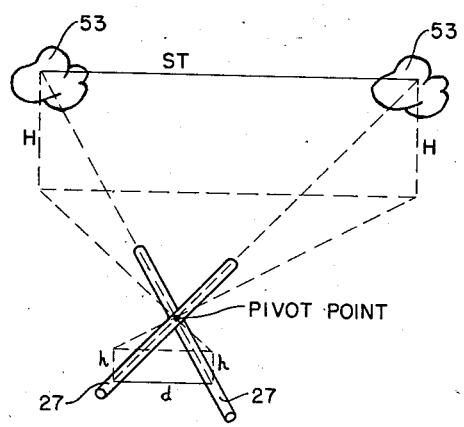
Figure 6 is a similar diagrammatic representation illustrating the situation when the cloud is at a higher altitude than the plane but off to one side.

Figure 6 is a diagram of the more general situation (of which Figure 5 is a special case) where the cloud sighted is above, but to one side of, the airplane's course. It is readily seen that there are produced two similar pyramids, the bases of which are in parallel, vertically disposed planes. Thus again the same equation and the solution given above may be applied. It will be noted that, in a case where the cloud is below and to one side of the airplane, the diagram and solution will be similar to that of Figure 6, except that the smaller pyramid will be inside, rather than outside, of the larger pyramid.

In using the calculator described herein, a number of errors may creep in to affect the final results. Such errors include those due to inaccurate timing or sighting and due to the difficulty of keeping the airplane on exactly the same heading, at exactly the same air speed and at exactly the same altitude during a run. Experience in using the said calculator has shown that for greatest accuracy the tracking operation should be commenced when the cloud is not more than 70° forward of the vertical and should be concluded when the cloud is not more than 70° aft of the vertical. Thus a cloud should preferably not be tracked through an arc more than 140°. Although reasonably accurate results have been obtained as a result of tracking operations through arcs of much less than 140°, nevertheless, based upon a considerable number of tests, it is believed that the best practice is to track through an angle closely approaching 140° but not exceeding it.

It will be clear that the principle of the invention described above may be used in many ways other than for determining cloud heights. One such application would be to determine the height of a plane above the ground by using the present calculator either from the plane or from the ground. In such use the ground speed would have to be substituted for air speed as S in the equation above.

While there has been described what is at present considered a preferred embodiment of the invention, it will be obvious to those skilled in the art that various modifications and changes may be made therein without departing from the invention and it is therefore aimed in the appended claims to cover all such changes and modifications as fall within the true spirit and scope of the invention.

What is claimed is:

1. In a calculator, an annular base member, means to sustain said base member, a substantially oval yoke positioned within said base member, its long diameter being aligned with a diameter of said base member, means to move said yoke longitudinally along its said long diameter and rotationally about said long diameter, gudgeon means disposed along the short diameter of said yoke, a sighting tube pivotally sustained by said gudgeon means, scale means adapted to indicate the longitudinal position of said yoke, ears upon said base member, trunnion means sustained by said ears and aligned at right angles to the long diameter of said yoke and in a plane parallel to and spaced from the said long diameter of said yoke, an elongated frame sustained by said trunnion means and adapted to rotate about its long axis, said sighting tube extending through said frame.

2. In a calculator, a circular base member, mutually aligned bearings sustained by said base member at diametrically opposite positions thereof, a shaft positioned in each of said bearings and adapted to be longitudinally slidable and rotatable, a substantially oval shaped yoke sustained by the inner ends of said shafts with its long diameter aligned with the axes of said shafts, a hollow sighting tube sustained by said yoke and pivotable about the short diameter thereof, a scale parallel to said shafts and frictionally coupled thereto for longitudinal movement therewith, an elongated frame sustained by said base member and pivotable about its long axis, the long diameter of said yoke and the long axis of said frame being perpendicular to each other and in spaced parallel planes, and the sighting tube extending through the frame.

3. In a calculator, a base member, leveling means to position said base member, a yoke sustained by said base member for slidable movement along its long axis and for rotation about said long axis, handle means to move said yoke, a scale frictionally coupled to said yoke to indicate its longitudinal position along its long axis, an elongated frame sustained by said base member for rotation about its long axis, the long axes of the said yoke and the said frame being perpendicular to each other and in spaced parallel planes, a sighting tube secured to the yoke and swingable about its short axis, and extending through the frame, the scale being calibrated in multiples of the space between the two planes aforesaid.

4. In a calculator, an annular base member, a yoke sustained by said base member so that its long axis is aligned with a diameter of said base member and so that it is adapted to be movable longitudinally along said long axis and rotatable about said long axis, handle means adapted to so move said yoke, two scales frictionally coupled to said yoke to indicate its longitudinal position along its long axis, calibrations upon said scales disposed in opposite directions, an elongated frame sustained by said base member for rotation about its long axis, the long axes of the said yoke and the said frame being perpendicular to each other and in spaced parallel planes, and a sighting tube secured to the yoke and swingable about its short axis and extending through the frame.

5. In a calculator as defined in claim 4, the calibrations upon said scales being in multiples of the space between the planes aforesaid.

WALDO D. GOSSARD.

Certificate of Correction

Patent No. 2,436,386 — February 24, 1948

WALDO D. GOSSARD

It is hereby certified that error appears in the printed specification of the above numbered patent requiring correction as follows:

Column 5, line 58, strike out the words "calculator described above may also be" and insert instead *equation above may then be written,*; line 64, for that portion of the equation reading "(feet) +" read *(feet)=* ; column 6, lines 70 and 71, for "equation" read *equations*;

and that the said Letters Patent should be read as corrected above, so that the same may conform to the record of the case in the Patent Office.

Signed and sealed this 29th day of May, A. D. 1951.

[SEAL]

THOMAS F. MURPHY,
*Assistant Commissioner of Patents.*